United States Patent [19]
Meyer

[11] 3,949,559
[45] Apr. 13, 1976

[54] PROCESS FOR ISOLATING AQUEOUS BRINE LAYERS IN UNDERGROUND GAS-STORAGE CAVERNS

[75] Inventor: Frank Meyer, Essen, Germany

[73] Assignee: Bergwerksverband GmbH, Essen, Germany

[22] Filed: Sept. 12, 1974

[21] Appl. No.: 505,380

[30] Foreign Application Priority Data
Sept. 17, 1974 Germany.............................. 2346740

[52] U.S. Cl................. 61/.5; 166/295; 260/2.5 AT
[51] Int. Cl.².................... B65G 5/00; E21F 17/16
[58] Field of Search........................ 61/.5; 166/295; 260/2.5 AT

[56] References Cited
UNITED STATES PATENTS

| | | | |
|---|---|---|---|
| 2,867,278 | 1/1959 | Mallory et al. ..................... | 166/295 |
| 2,889,883 | 6/1959 | Santora............................... | 166/295 |
| 2,939,884 | 6/1960 | Garrison .................................. | 61/.5 |
| 2,939,895 | 6/1960 | Hess et al. ................................ | 61/.5 |
| 2,942,424 | 6/1960 | Koble...................................... | 61/.5 |
| 3,591,532 | 7/1971 | Abercrombie et al. ........ | 260/2.5 AT |
| 3,613,378 | 10/1971 | Dunlap et al. ........................... | 61/.5 |
| 3,812,619 | 5/1974 | Wood et al. ................... | 260/2.5 AT |

*Primary Examiner*—Jacob Shapiro
*Attorney, Agent, or Firm*—Michael J. Striker

[57] ABSTRACT

Process for isolating aqueous brine layers in underground gas-storage caverns which comprises injecting into the said cavern a liquid polyurethane-resin-forming composition that is hardenable by reaction with water which, upon hardening, forms a resinous barrier between the brine and the gas-storage space thereabove that is essentially impervious to water vapor. The liquid hardenable polyurethane-resin-forming composition comprises a polyol and a polyisocyanate of an aromatic hydrocarbon.

12 Claims, No Drawings

PROCESS FOR ISOLATING AQUEOUS BRINE LAYERS IN UNDERGROUND GAS-STORAGE CAVERNS

BACKGROUND OF THE INVENTION

Caverns of large size for the storage of gases have been formed by washing out with water subterranean salt beds or strata. Since these caverns are located at considerable depth, for example, 1400 meters below the earth's surface, it is practically impossible to wash out completely the saline waters or brine that are thus left therein. Moreover, this sediment or brine cannot readily be removed therefrom except by costly technical means.

The sediment or brine which remains in the cavern consists essentially of a concentrated salt solution that has the undesirable property of humidifying, that is, wetting or moistening the stored gas, as a consequence of which the gas must be dried again before use, thereby greatly increasing its cost to the consumer.

In an attempt to prevent the humidification of natural gas by contact with such brines or sediments in such caverns, the surface of the brine was coated with a heavy mineral oil. Such a procedure, however, proved not to be effective, because, in many cases, the higher-boiling hydrocarbons, such as propane and butane, which are present in natural gas and which, under the pressure prevailing in the cavern, are in contact with the surface of the oil layer, dilute the oil layer, and render it ineffective as a separating layer or barrier.

Solidification of the brine with a hydraulic cement is not possible since the cement must be mixed together mechanically with the brine and this is not possible in such subterranean gas-storage caverns which do not have shafts through which tools or workmen can be moved.

SUMMARY OF THE INVENTION

It has now been discovered that the layer of brine at the bottom or floor of such underground caverns formed from washed-out salt strata can be isolated from the remainder of the cavern if the brine layer is coated with a hardened polyurethane resin such as that produced from a high-molecular polyurethane prepolymer having reactive isocyanate radicals which hardens by reaction with water.

In accordance with the process of the present invention, such a liquid mixture containing reagents capable of reacting to form with water a hardened foamed polyurethane resin are injected into the cavern so that the liquid accumulates as a thin layer on the surface of the brine. After a certain definite period a light hardened foamed polyurethane resin layer having a certain elasticity or plasticity forms as a result of the reaction of the water of the brine with the supernatant layer of liquid polyurethane-resin-forming composition, thereby forming a barrier between the brine and the storage space thereabove in the cavern that prevents any substantial passage of moisture from the brine thereinto.

DETAILED DESCRIPTION AND PREFERRED EMBODIMENTS OF THE INVENTION

For carrying out the process of the present invention all two-component compositions that are adapted to produce polyurethane resins upon reaction with water, as well as commercial one-component prepolymer compositions such as that available from Farbenfabriken Bayer A. G. under the trade name Desmodur Type E, are suitable. In accordance with the process of the present invention, a composition consisting of a mixture of a polyisocyanate of an aromatic hydrocarbon and a polyol or a prepolymer thereof is passed or injected into the cavern. Polyisocyanates of aromatic hydrocarbons that are suitable for this purpose are, for example, tolylene diisocyanates [bis(carbonylamino)-toluenes], the diisocyanate of diphenylmethane [4,4'-bis(carbonylamino)-diphenylmethane] as well as triisocyanates, tetraisocyanates and higher polyisocyanates of such aromatic hydrocarbons.

Polyols which are suitable for this purpose are ethylene glycol, butylene glycol, and mixtures thereof, as well as esters of ethylene glycol and glycerol with adipic acid (hexanedioic acid), and similar carboxylic acids, which polyols have a hydroxyl number between 200 and 400, and preferably between 300 and 350.

Polyols that are also well suited for this purpose are polyether glycols such as are described on pages 50 and 51 of volume 14 of *Ullmanns Encyklopaedie der technischen Chemie*, Third Edition, Urban & Schwarzenberg, Munich, 1963, which include, for example, polyether glycols such as that produced by reaction of propylene oxide and trimethylolpropane which has a hydroxyl number between 320 and 370 (referred to as type A in Example 1 hereinafter) and that having a hydroxyl number between 340 and 400 produced by reaction of propylene oxide with a condensation product of sucrose and 1,2-propanediol in the molecular ratio of 5 mols of 1,2-propanediol per mol of sucrose.

Suitable plasticizers which can be used in the mixture are, for example, aliphatic hydrocarbons such as mineral oils, mineral oil extracts having a high content of aromatic hydrocarbons, free fatty acids, tall oil, coal tar and similar liquid distillates from the destructive distillation of bituminous coal, as well as phosphate and phthalate esters such as tricresyl phosphate and dibutyl phthalate. Castor oil is an especially suitable plasticizer for this purpose.

The mixture of polyurethane-resin-forming components that is charged into the cavern forms a thin liquid layer on the brine surface and the polyisocyanate reacts at the boundary of the two surfaces that are in contact with each other with the water in the brine layer to form a polyurethane resin. Through the thin membranous film of polyurethane resin thus formed further amounts of water gradually diffuse thereinto as a result of which a foamed layer of polyurethane resin is built up.

Although the conformation or shape of a salt cavern may change as a result of earth-building movements of its surrounding walls, the polyurethane resinous coating layer, because of its plasticity, will adjust itself to such movements and will remain as a barrier between the brine layer and the internal storage space of the cavern.

The reasons why polyurethane resins are especially suitable for solving the problem posed by the brine remaining in such subterranean gas-storage caverns is attributed to the fact that the polyisocyanate of the aromatic hydrocarbon that is present in the initially liquid resin composition hardens by reacting quantitatively with the water which is present in the brine. This reaction of the polyisocyanate was unexpected since it is well known that mixtures of diisocyanates of aromatic hydrocarbons react spontaneously with water to form carbon dioxide and crumbly polyureas.

In accordance with a preferred embodiment of the present invention, a second layer of liquid polyurethane-resin-forming components is charged into the cavern to cover the prior layer of foamed polyurethane resin that had previously been formed over the brine layer. However, because the humidity of the gases in the gas-storage space of the cavern is not sufficient to produce a foamed polyurethane resin, the second coating that is formed is not expanded or foamed or is only slightly expanded so that the resulting coating is an especially thick and impervious barrier to the passage of water vapor from the brine layer into the storage space.

It has also been found to be especially advantageous to use a stoichiometric excess of the polyisocyanate component in the liquid polyurethane-resin-forming composition that is injected into the cavern. Although generally the polyisocyanate and polyol are used in such stoichiometrical proportions that one carbonylamino (—NCO) radical of the polyisocyanate is present for each hydroxyl (—OH) radical of the polyol, it has been found to be advantageous to use a stoichiometric excess of, for example, between 30 and 50 % by weight of the polyisocyanate, in order to obtain a layer that is essentially impervious to water vapor that also adheres to the brine and that adheres and seals around its edges.

EXAMPLE 1

A liquid polyurethane-resin-forming composition that is especially adapted for injecting into underground gas-storage caverns to produce a barrier to water vapor originating from the brine therein consists of the following:

70 parts by weight of a technical diisocyanate of diphenylmethane having a carbonylamino content between 30 and 32 %, 25 parts by weight of polyether glycol produced by reaction of propylene oxide and trimethylolpropane having a hydroxyl number of about 330 (type A), and 5 parts by weight of castor oil.

For the production of a layer having an adequate thickness for the purposes described herein, an amount of between 5 and 20 liters of the foregoing liquid composition per square meter of surface are generally sufficient. If desired, known inhibitors may also be added to the foregoing composition to retard its hardening.

The polyurethane resinous barriers formed in accordance with the processes of the present invention are quite unaffected by natural gas and other liquid and solid hydrocarbons.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention.

What is claimed as new and desired to be protected by Letters Patent is set forth in the appended claims.

I claim:

1. A process for isolating a residual aqueous brine layer in an underground gas-storage cavern which comprises injecting into the said cavern a liquid polyurethane-resin-forming composition that is hardenable by reaction with water, the composition being injected in such an amount as to form a continuous layer over the entire floor surface of the cavern and above the brine layers so that the liquid resin-forming composition, after reaction with the water in the aqueous brine layer with which it is in contact, forms an essentially continuous unitary layer of a foamed polyurethane resin that is essentially impervious to water vapor between the residual brine layer and the gas-storage space thereabove.

2. A process as defined in claim 1 in which the liquid hardenable polyurethane-resin-forming composition contains a reactive polyisocyanate of an aromatic hydrocarbon.

3. A process as defined in claim 1 in which the liquid hardenable polyurethane-resin-forming composition contains a diisocyanate of an aromatic hydrocarbon and a polyol.

4. A process as defined in claim 1 in which the liquid hardenable polyurethane-resin-forming composition also contains a plasticizer.

5. A process as defined in claim 3 in which the molecular ratio of the polyisocyanate to the polyol in the liquid hardenable polyurethane-resin-forming composition is in excess of one equivalent of carbonylamino radicals of the polyisocyanate for each molecular equivalent of hydroxyl radicals of the polyol.

6. A process as defined in claim 1 in which a second layer of the polyurethane resin is formed over the first layer by injecting into the said cavern a further amount of a liquid hardenable polyurethane-resin-forming composition.

7. A process as defined in claim 3 in which the polyisocyanate in the liquid hardenable polyurethane-resin-forming composition is the diisocyanate of diphenylmethane.

8. A process as defined in claim 3 in which the the polyol in the liquid hardenable polyurethane-resin-forming composition has a hydroxyl number between 200 and 400.

9. A process as defined in claim 3 in which the polyol in the liquid hardenable polyurethane-resin-forming composition is a polyethylene glycol having a hydroxyl number between 200 and 400.

10. A process as defined in claim 3 in which the polyol in the liquid polyurethane-resin-forming composition is a polyether glycol having a hydroxyl number between 320 and 370 that was produced by reaction of propylene oxide with trimethylolpropane.

11. A process as defined in claim 3 in which the polyol in the liquid polyurethane-resin-forming composition is a polyether glycol having a hydroxyl number between 340 and 400 that was produced by reaction of propylene oxide with a condensation product of sucrose and 1,2-propanediol in the molecular ratio of 5 mols of 1,2-propanediol per mol of sucrose.

12. A process as defined in claim 4 in which the plasticizer is castor oil.

* * * * *